United States Patent [19]

Jackson

[11] 4,241,775

[45] Dec. 30, 1980

[54] TIRES

[75] Inventor: William L. Jackson, Sutton Coldfield, England

[73] Assignee: Dunlop Limited, London, England

[21] Appl. No.: 934,277

[22] Filed: Aug. 16, 1978

[30] Foreign Application Priority Data

Aug. 25, 1977 [GB] United Kingdom .............. 35662/77

[51] Int. Cl.³ .................. B60C 5/02; B60C 13/00; B60C 17/04

[52] U.S. Cl. .................. 152/330 RF; 152/353 R; 152/354 R; 152/361 R; 152/362 R; 152/375

[58] Field of Search .............. 152/151, 152, 155, 157, 152/158, 246, 251, 323, 329, 330, 352–354, 361 R, 362 R, 375, 379

[56] References Cited

U.S. PATENT DOCUMENTS

| | | | |
|---|---|---|---|
| 2,010,260 | 8/1935 | Gladden | 152/155 |
| 2,524,808 | 10/1950 | Khalil | 152/340 |
| 3,734,157 | 5/1973 | Roque | 152/354 |
| 4,015,652 | 4/1977 | Harris | 152/379.1 |
| 4,091,856 | 5/1978 | Jackson | 152/361 R |
| 4,111,249 | 9/1978 | Markow | 152/330 RF |
| 4,137,960 | 2/1979 | Cataldo | 152/158 |

FOREIGN PATENT DOCUMENTS

6961 of 1897 United Kingdom .
28233 of 1904 United Kingdom .

Primary Examiner—John E. Kittle
Attorney, Agent, or Firm—Stevens, Davis, Miller & Mosher

[57] ABSTRACT

A tire or tire and wheel assembly in which the sidewalls are pretensioned before being loaded and/or deflected. Various pretensioning means are disclosed including some for displacing the beads radially, axially or circumferentially, and some for applying a radially outwards force to the tread. There is thus a tendency to lengthen the or each sidewall thereby creating pretension.

52 Claims, 35 Drawing Figures

TIRES

This invention relates to wheel and tire assemblies and to tires for vehicles and in particular to tires providing the standards of comfort, load carrying and road holding normally associated with pneumatic tires.

In conventional pneumatic tire and wheel assemblies air pressure is utilized to tension the carcass and when load is applied to the assembly the carcass tension near that part of the tire contacting the ground is progressively reduced so that effective load bearing support is obtained by the carcass tension in other parts of the tire. Conventional pneumatic tires are subject to complete loss of effective load support in the event of loss of air pressure. Conventional solid tires support load by subjecting the tire to compressive loads in the ground contacting portion of the tire. Such solid tires are, however, prone to heat build-up and are therefore subject to limitations of speed and load.

It is known that if the sidewalls of a pneumatic tire are provided with an inherent degree of pretension, effective load support is not completely lost if the tire is deflated. However previous tires or tire and rim assemblies including pretensioned sidewalls have suffered from various disadvantages.

For example it is known from U K Patent No. 6961 of 1896 to insert in the cavity between tire and wheel rim a steel strip of rectangular cross-section, of width slightly less than the tire tread width, and length equal to several times the tire tread circumference. Such a strip has an inherent tendency to unwind (acting as a large spring) and thus applies a radially outwards force beneath the tire tread causing the tire sidewalls to be placed in tension. It is also known to replace the tread reinforcing belt (the "breaker") of a radial ply tire by a metal hoop, of width substantially equal to that of the belt but of greater diameter, again to place the sidewalls in tension. In both instances the use of a solid metal strip which prevents local deflection of the tire tread in a radial direction substantially reduces the ride comfort of the tire.

Alternatively it is known from U K Patent No. 28233 of 1903 to tension the sidewalls by causing radially inward displacement of the tire beads. However this is difficult to achieve in practice since the bead wire has to be made discontinuous in order to allow its diameter to be reduced on radially-inward displacement.

It is an object of the present invention to provide a tire or a tire and wheel rim assembly which does not suffer from these disadvantages.

In accordance with the invention a tire and wheel assembly comprises a wheel rim including a circumferentially-extending bead seat and a tire comprising a circumferentially-extending bead region retained upon the bead seat by a continuous bead ring which is substantially incapable of circumferential expansion or compression, a circumferentially-extending tread which is capable of resisting circumferential expansion but capable of local radial deflection and a load-carrying-wall having a radially innermost edge and a radially outermost edge, the radially outermost edge being attached to the tread and the radially innermost edge being attached to the bead region, the wall having tension-resisting reinforcements extending between said edges and being capable of being placed in tension, and pretensioning means for placing said tension-resisting reinforcements in tension after the tire has been built, and before the tire is loaded.

If the tire is pneumatic, preferably the pretensioning means is capable of placing the tension-resisting reinforcements in tension before the tire and rim is inflated.

In a preferred arrangement the tire and wheel rim assembly comprises a wheel rim having a pair of axially spaced-apart, circumferentially-extending bead seats and a tire comprising a pair of load-carrying tire walls axially spaced-apart to provide tire sidewalls, each sidewall being attached at its innermost edge to a bead region retained upon a respective bead seat at its outermost edge to a respective edge of the tread.

Preferably also the or each sidewall of the assembly is straight or includes a substantial portion of its radial length which is straight, when an axial cross-section of the tire is considered. The tread is preferably reinforced by a breaker extending like a belt around the tire.

The reinforced wall or walls preferably has or have a low resistance to compression forces in the radial direction.

High tensile strength, low elongation reinforcement materials are preferred to reinforce the wall or walls so that when the assembly is subjected to load in use the tension forces in the reinforcements in the deflected ground contacting sector of the assembly are immediately reduced near to zero.

The tension resisting reinforcements may be cords or wires extending radially or at an angle to the radial direction. The cords or wires may be part of a ply or plies of woven or non-woven material but preferably comprise a substantially radially extending ply of conventional substantially weftless tire cord fabric.

Pretension in the wall reinforcement may be achieved by various pretensioning means including means provided in the wheel rim itself to axially displace the bead regions together or further apart on assembly, thereby tending to lengthen the walls. For example, the wheel rim may be divided into two parts each having one of the bead seats, and on securing the two wheel rim parts together the bead seats are forced together pretensioning the sidewalls of a tire mounted on the rim.

Alternatively pretension may be obtained by relative circumferential bead seat or region movement, or distorting the sidewall so that it follows a lengthened path compared with its path when not distorted. Then again shrinkage of the reinforcement can be induced, for example by heating, to pretension the reinforcement.

Another pretensioning means comprises means for applying a radially outwardly directed force to the tread. For example the pretensioning means may comprise a fluid contained under pressure in a tubular cavity radially inwardly of the tread and supported by a rigid hoop. Alternatively the pretensioning means comprises a solid material e.g. rubber, or semi-solid material e.g. foam, in compression radially inwardly of the tread. The solid or semi-solid material may be supported on a rigid hoop. In each case, the tread is preferably reinforced by a breaker, which is capable of radial deflection but substantially incapable of circumferential expansion and which receives the radially-outwardly directed force.

According to a further aspect of the invention a tire comprises a pair of axially spaced-apart bead regions, two sidewalls and a tread, a breaker radially beneath said tread, a tubular cavity radially beneath said breaker and extending circumferentially around the tire, having a width substantially equal to the width of the breaker and a radial height substantially less than the tire sectional height, and a substantially rigid hoop located in the radially inner surface wall of the tubular cavity and having an axial dimension similar to the axial width of said cavity wherein the cavity is pressurized with fluid so as to apply a radially outwards force to the breaker and thereby pretension the sidewalls.

Preferably the sidewalls are reinforced by radially extending reinforcement cords which are continuous from one bead region to the other, said cords radially overlying the breaker in the tread region of the tire carcass.

The cavity may be air or liquid filled and it is preferred to pressurized only the cavity formed within the tread region and not the main tire cavity which should be close to ambient pressure.

The rigid hoop may be formed by various means for example, a simple steel hoop or may be formed by a thicker hoop of softer material which may be reinforced by more conventional means similar to conventional tire breakers. A suitable choice of material and design may allow the natural frequency of the hoop to be varied to provide harmonic damping so that the tire can be tuned for various vehicle applications.

The cavity of this aspect of the present invention is effectively a generally flat tube between the breaker and the hoop and the overall effect is to provide at each edge of the tread region a stiffened ring one for each sidewall.

The edges of the cavity may be formed with a reversed curvature such that the fluid pressure in the cavity tends to straighten the edges. This effect increases still further the stiffening forces applied to the edges of the tread.

An alternative support for the tread edges comprises a circular cross-section tube provided radially beneath a substantially transversely rigid breaker which tube is helically wound with a reinforcement laid at a high angle such that inflation of the tube causes its main radius to enlarge without any substantial change in cross-sectional area so that radially outward stabilizing forces are applied by the reinforced tube to the centre of the breaker and the transverse stiffness of the breaker thus provides the required tread edge region support.

In this arrangement again only the tube need be pressurized and the main tire cavity is not so pressurized. Pressurized gas or liquids may be used to radially extend the tube.

The tube length may be several times that of the tread and is helically coiled to extend both underneath and across the width of the tread.

According to a further aspect of the invention a tire comprises a pair of axially spaced-apart bead regions, two sidewalls and a tread region comprising an outer layer of tread rubber compound, a breaker reinforcement having a substantial degree of transverse rigidity having an axial width substantially equal to and being located radially beneath said tread compound, a relatively rigid hoop extending around the tire beneath and spaced-apart from the breaker and between the said breaker and rigid hoop a series of precompressed blocks of resilient material so as to connect the breaker and thus the tread and its edges to said rigid hoop. The precompression of the blocks pushes the breaker outwards against the restraint of the sidewalls thus providing the pretension. The blocks of resilient material preferably are a continuous ring and are of elastomeric material such as, for example rubber.

The rigid hoop may be at any conventient position radially between the breaker and the wheel rim and in one arrangement the wheel rim itself may provide the rigid hoop. In such an arrangement the resilient ring or blocks extend radially from the breaker to the wheel rim.

It will be appreciated that one embodiment of the last described arrangement is to use a single support wall which is pretensioned by two rings of compressed resilient material one at each side of said wall so as to provide the simplest solid tire arrangement according to the present invention.

Some embodiments of the present invention will now be described, by way of example only, in conjunction with the attached diagrammatic drawings in which.

Figure 1:
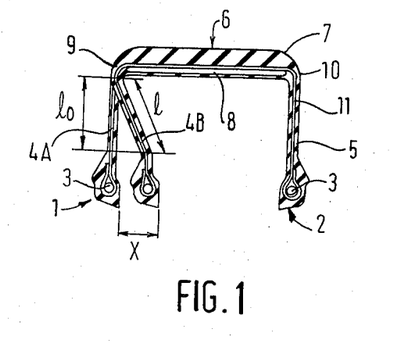
FIG. 1 is a cross-section of part of a tire of an assembly according to the present invention to illustrate pretension in the sidewalls.

The tire shown in FIG. 1 comprises a pair of axially spaced-apart bead regions 1,2, each including a bead wire 3 of conventional type. The tire has two sidewalls 4 and 5 the left-hand sidewall 4 being shown in two positions 4A and 4B. The sidewalls 4 and 5 terminate at the edges of a tread region 6 which comprises a tread rubber compound upper zone 7 and a transversely stiff breaker 8 which is reinforced also in the circumferential direction so as to provide a stiffened hoop having a pair of hoop-like edge regions 9 and 10 to which each sidewall 4,5, is connected. A radial carcass reinforcement ply 11 extends from bead wire 3 to bead wire passing through the tread region 6 over the breaker structure 8.

As can be seen in the left-hand portion of the drawing axially inward displacement of a bead by means to be described below effects an increase in sidewall length from $1_o$ to 1 and thus the reinforcement 11 is pre-tensioned by an amount dependent on the various dimensions and the axial bead movement x.

Figure 2A:
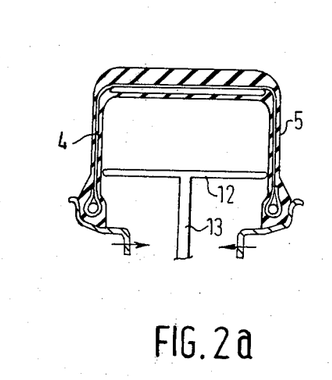
FIGS. 2A and 2B show alternative sidewall pretensioning means using a separator to improve the effect.
Figure 2B:
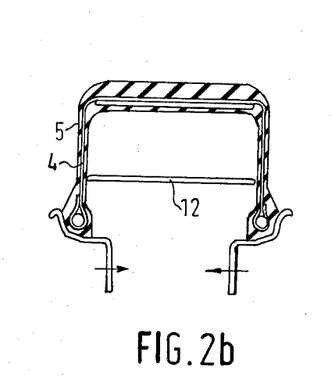

FIGS. 2a and 2b show a means of increasing the sidewall pretension for a given bead movement utilizing a separator ring 12. The separator ring 12 contacts both sidewalls 4,5, to prevent their moving inwards and thus causes greater sidewall pretensioning for a given bead movement. As shown in 2a the separator 12 is mounted on a plate 13 retained between the parts of a divided wheel rim. The separator of FIG. 2b is not retained but selfsupported by the tire sidewalls.

Figure 3A:
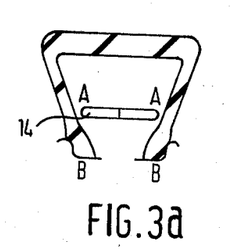
FIGS. 3A and 3B show further sidewall pretensioning means using an adjustable separator within the tire.
Figure 3B:
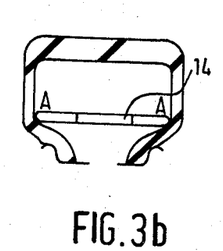
Figure 4:
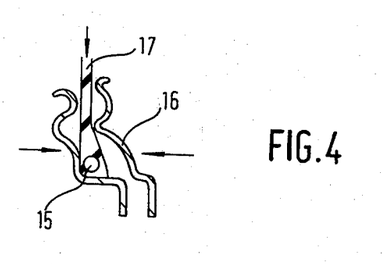
FIG. 4 shows a method of individually pretensioning each sidewall by bead holding means in the rim.

Another sidewall pretensioning means is shown in FIGS. 3a and 3b and this comprises an axially expandable separator 14 which is expanded after assembling together the tire and wheel rim so as to tension the sidewalls by forcing the sidewalls outwardly as shown in FIG. 4b. The main sidewalls are then radial and straight as required.

Conventional tires have heavily reinforced-bead regions but tires according to the present invention may be designed to generate much smaller radial stresses than in conventional tires. Accordingly a heavy bead wire is not essential in all constructions.

Another means to pretension the sidewalls comprises the multipiece wheel rim shown in part in FIG. 4. When the two shaped rim portions 15,16 are clamped together the sidewall which is straight at first is crimped and therefore the portion 17 above the wheel rim portions 15 and 16 is placed in tension.

It is known that thermoplastic cords can be overstretched and temporarily stabilized, or heat set, at a relatively low temperature such that a secondary heat cycle above the stabilizing temperature causes them to shrink back to their original length. Such an operation causes tensile forces to be built up and thus provides a means of pretensioning or at least partially pretensioning the sidewalls of a tire.

Figure 5A:
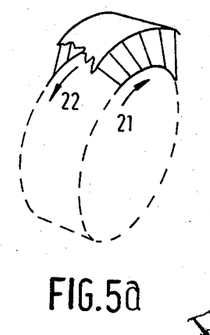
FIG. 5A shows diagrammatically an alternative sidewall pretensioning system using relative circumferential movement between the beads.
Figure 5B:
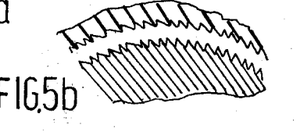
FIG. 5b shows a partial side view of part of a tire bead region and a bead seat each having saw-tooth-like edges which act like a ratchet.

Yet another means of pretensioning the sidewalls is to use a rim divided into two parts, a bead seat on each part and after securing the bead regions to the seats, e.g. by adhesive, rotate the bead regions and seats circumferentially with respect to one another as shown in FIG. 5 where the two directions are indicated as 21 and 22. The two parts of the wheel rim are then bolted together to maintain the pretension for use of the tire and wheel assembly. However it is appreciated that in many instances, particularly where the pretension is generated by circumferential movements of the bead regions, relaxation can take place and the pretension should be simply re-applied manually or preferably, automatically. One such means comprises the provision on each bead seat on the rim with a plurality of axially extending ridges, of saw-tooth cross-section, and the radially inner side of the tire bead could be similarly shaped, thus providing a ratchet to retain circumferential displacement. The ridges have unequal length sides and are of different inclinations, and preferably also do not mate exactly over the whole length of a bead seat so that there are always portions of the bead seat which are mating, and others which are not. As the tire rotates, there is always a tendency for the tire bead to creep around its bead seat and by providing ridges as described the tire bead can be made to move relative to the rim during rotation. If the other bead seat is similarly formed with ridges, but shaped to induce creep or movement of the bead in the opposite direction the pretensioning created in the sidewall will be automatic. However the pretension in the sidewalls cannot rise indefinitely since the tension in sidewall reinforcement resists the creep. Depending on the properties of the sidewall reinforcement an equilibrium situation is reached where once a minimum pretension value has been created, no further creep will occur.

There are many ways of generating the various relative movements of the beads but a few will now be described as examples. Firstly three basic means for generating relative lateral movement between a pair of axially spaced-apart bead seats will be mentioned.

The first is to use a divided rim and use screw threads to hold the two halves together. For example the two halves might be brought together in a press and then held in that position by nuts and bolts. Or the nuts and bolts might be tightened to bring the two halves together.

Figure 6:
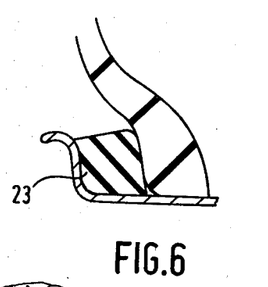
FIG. 6 shows one method retaining a bead to tension the sidewall.

The second (see FIG. 6) simply requires that one or both beads be pushed inwards and held away from the rim flange, by a packing piece 23.

The third requires that the rim be in two overlapping cylindrical parts pressed together by external means and locked in position by screws, rivets or pegs passed radially from inside the rim to the outside.

Figure 7A:
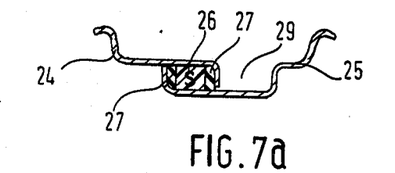
FIGS. 7a–7f show bead spacing devices utilizing two-piece wheel rims and hydraulic or pneumatic operation.

Another means for generating relative lateral displacement is a pressurized two-part rim as shown in FIG. 7a in which the left-hand part 24 as shown is separate from the right-hand part 25. An enclosed space 26 is defined between the two parts and is sealed by elastomeric rings 27 as shown and then pressurized by gas, liquid, or solidifying liquid (including foam generators).

Figure 7B:
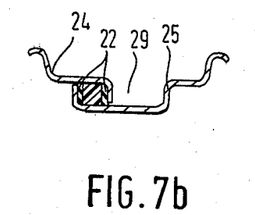
Figure 7C:
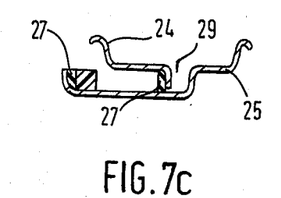

The pressure urges the two rim parts axially towards each other and if a solidifying liquid is used, this can lock them in place as in FIG. 7b. The solidified liquid and seals can be removed (and fresh seals inserted) by pressing the rim parts further together as in FIG. 7c.

Figures 7D, 7E:
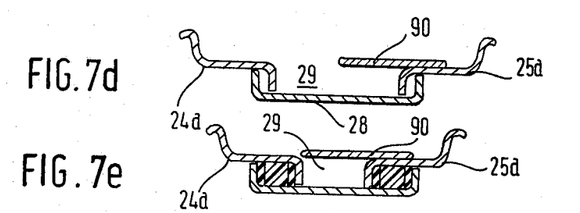
Figure 7F:
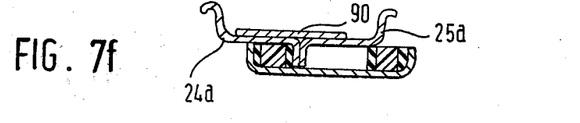

FIGS. 7d, 7e and 7f show a three-part rim, comprising axially outer parts 24a and 25a, axially movable on a central part 28. Displacement of the bead seats is again effected by pressure.

The rims shown in FIGS. 7a–7f have a central well 29, i.e. a reduced diameter between the bead seats, which is useful for tire fitting. It is also possible to arrange for this well to be closed off (e.g. by a ring 90 shown in FIGS. 7d–7f attached to part 25a) in normal use so that the tire bead cannot possibly fall back into the well. It is still possible to arrange for access to the pressurized material and seals shown in FIGS. 7d (fitting) 7e (normal use) and 7f (demounting).

Assemblies incorporating these rims have the advantage that since inflation pressure is applied to pull the beads together, a further inflation can be used to re-apply the pretension should relaxation occur.

Figure 8A:
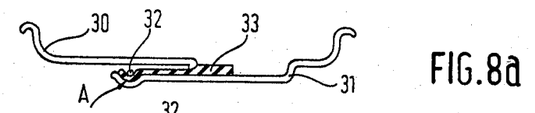
FIGS. 8a and 8b show a bead spacing device using an elastomeric material sleeve to maintain pretension in the sidewalls.
Figure 8B:
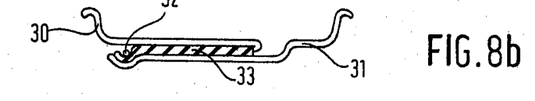

FIGS. 8a and 8b show a further rim which is intended to be closed by an external press. It is simpler than the rims of FIGS. 7a–7f in that the two parts 30,31 of the rim can be completely separate from one another and only brought together when the tire is fitted.

The device exploits the fact that elastomeric compounds generally have a very high bulk modulus combined with a low shear modulus. The right-hand part 31 of the rim carries an elastomeric sleeve 33 attached at its left-hand edge by a spring clip 32 but free to slide on the rim over most of its width. In FIG. 8a the left-hand part 30 of the rim is being forced over the sleeve 33 stretching it in the lateral direction. Once the rim has passed over the sleeve 33, as in FIG. 8b, it snaps back to completely fill the space between the two rim parts 30,31. Since the tire beads are exerting a lateral outward force this arrangement maintains an edge-wise compressive force on the sleeve 33 which expands radially against the two rim parts 30,31, making a strong joint. Friction between the rim surfaces and the sleeve 33 can be encouraged by providing asymmetric knurling.

The rim can be dismantled by pushing the two parts 30,31 closer together to expose and remove the spring clip 32 at 'A' and then by pulling on the edge of the sleeve 33. Axial tension on the sleeve 33 reduces its thickness and allows it to slide out easily.

Various refinements are possible, for example, the provision of a hard right-hand edge or a different fastening at 'A' and so on.

Figure 9A:
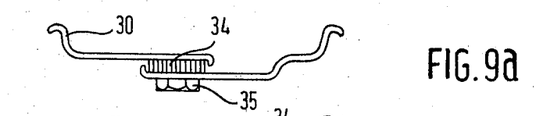
FIGS. 9a, 9b and 9c show a simple mechanically retained divided wheel rim to give a controlled pretension.
Figures 9B, 9C:
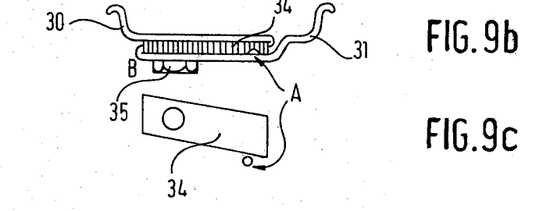

FIGS. 9a–9c show a third rim in which the rim parts are maintained in a closed position by means of rigid spacers.

A set of at least three spacers in the form of plates 34, each shaped as in FIG. 9c, are rotated from the position in FIG. 9a to that of FIG. 9b while the flanges are pressed towards each other by external means. Rotation may be effected by rotation of a nut 35 or by working through holes in the inner (right-hand) rim part 31. The shape shown in 9c together with a projection 36 on the radially outer surface of the right-hand part 31 provides a stable configuration which does not need a locking nut.

Figure 10A:
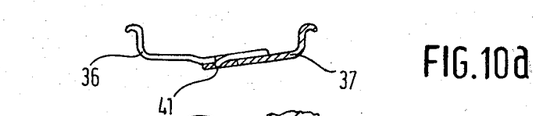
FIGS. 10a, and 10b show a snap assembly divided wheel rim assembly.
Figure 10B:
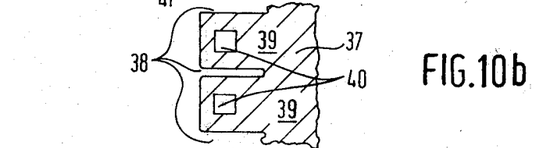

FIGS. 10a and 10b show a rim including a spring lock. FIG. 10a shows a cross-section through a rim comprising a left-hand part 36 and a right-hand part 37 shown connected in FIG. 10a. In FIG. 10b the right-hand part 37 is shown in plan, looking along a radius. Regularly spaced around the circumference of part 37 are slots 38, which create a plurality of leaves 39 which must have a limited amount of springiness. In the centre of each leaf is a hole 40. The left-hand part 36 is provided with projections 41 on the inner surface, the projections being spaced and shaped to engage the holes 40 when the two parts are pressed together by external means. The two parts can be separated by pressing a circular wedge or knife blade (not shown) between them (from the left as shown) in order to force the spring leaves inwards to disengage the holes from the projections.

Figure 11:
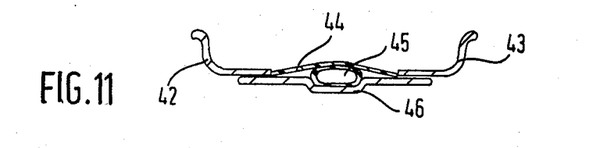
FIG. 11 shows yet another hydraulic or pneumatic means for pretensioning the sidewalls using a simple tube to retain the pressure and mechanical means to move the bead seats.

FIG. 11 shows a rim having two loose bead seats and associated rim flanges 42,43, connected by relatively flexible axially-extending straps 44. A tube 45 is trapped in the space between the straps and a cylinder 46. If this space is then pressurized the straps 44 move towards a semi-circular cross-section pulling the bead seats and rim flanges 42, 43 inwards. The pressurizing fluid may be gas, liquid, or a solidifying liquid. Alternative mechanical means may be used to raise the strap centres.

Figure 12:
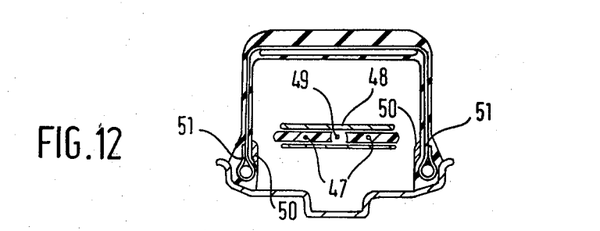
FIG. 12 shows in greater detail an adjustable separator similar to that shown in FIGS. 3a and 3b.

FIG. 12 shows in more detail one expanding separator as previously shown in FIGS. 3a and 3b. Two hard elastomeric hoops 47 are disposed side-by-side between inner and outer rigid hoops 48 and 49. Inflation of the annular space 49 by gas or liquid forces and hoops 47 axially outwards to press against the sidewalls generating pretension. Location of the separator is achieved by the use of a projection 50 inside the lower sidewall 51.

A similar result can be achieved mechanically by using rectangular cams in the space 49 turned by keys passed through the rim, or by toggle actions of various sorts.

Figure 13:
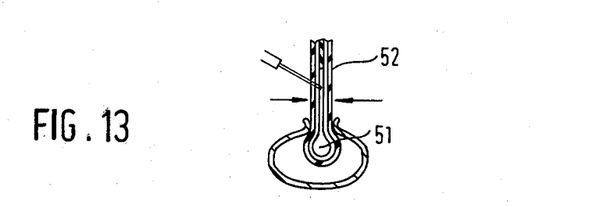
FIG. 13 shows a method of inwardly radially displacing the bead region of a tire by hydraulic means.

FIG. 13 shows one of a number of possible arrangements in which the space 51 normally occupied by the bead coil can be inflated, in this case through a hollow needle. The 'turn-up' of the reinforcing material is securely attached to the main ply radially outward of the point 52 but inward of this it is loose. When inflated this material is pulled down to line the rim cavity, thus generating a radial pretension in the sidewall. The two arrows shown in FIG. 13 represent a restraint which would be necessary in this particular example to prevent bulging above the rim cavity, but this is not a general problem with this type of device.

Figure 14:
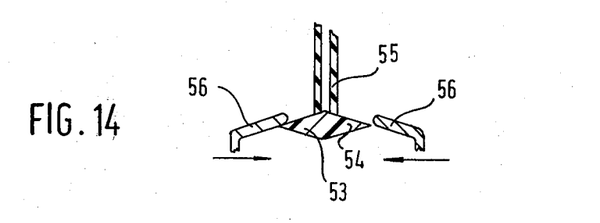
FIG. 14 shows a mechanical equivalent to the FIG. 13 assembly.

FIG. 14 shows an alternative way of achieving a similar result. Hard wedge-shaped hoops 53 and 54 (e.g. of nylon) are bonded together and to the inner edge of the sidewall 55. These hoops are engaged by sloping rim flanges 56 in such a way that closure of the flanges drags the hoops radially inwards. This tends to generate circumferential compression of the wedge but the strain is quite small compared with the sidewall strain (particularly for small tires on large rims). The wedges may be shaped to give a large initial movement and a better mechanical advantage towards the end of the movement. Some means of applying a radially-outwardly directed force to the tread will now be described and it should be understood that these may be used with any of the sidewall pretensioning means described above.

Figure 15:
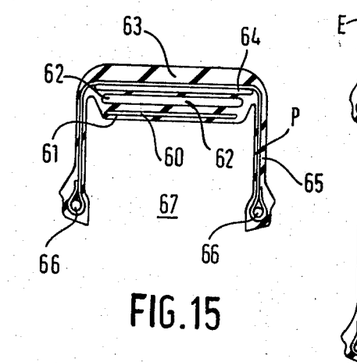
FIG. 15 shows a cross-section of a tire of an assembly according to the present invention to show details of the tread region and carcass radially outwards force being applied to the tire breaker.

FIG. 15 shows a tire having a hoop 60 which is relatively rigid and may, for example, comprise a flat steel strip shaped into a hoop which is moulded into an inner wall 61 of a tubular cavity 62. The cavity 62 is of a similar width to the tread region 63 of the tire and a breaker 64 is provided in the radially outermost wall of the cavity 62. The breaker 64 is basically a conventional tire breaker but is made in addition substantially rigid in the transverse direction by, for example, an additional reinforcement ply laid at 90° to the circumferential direction. The remainder of the tire comprises straight sidewalls 65, bead regions 66 and a radial ply reinforced carcass P which has the ply cords extending from bead to bead and passing through the tread region of the tire over the breaker 64 as shown.

It is a feature of this arrangement that the relatively small cross-section radius of the edges of the cavity do not bulge sideways and that they therefore prevent any lateral pressure being applied to the sidewalls. These are therefore able to remain straight as required by the invention, under the influence of the radial tension only.

The main annular cavity 67 of the tire is not inflated but only the thin, flat annular cavity 62.

It can be seen that in this example a radial sidewall pretension $F_o$ causes a compressive circumferential stress T in the breaker where:

$$\frac{T}{R} = -2F_o$$

T = Breaker Tension
R = Breaker Radius
$F_o$ = Sidewall Tension per unit circumference.

If the breaker is sufficiently resistant to compression this balance of forces is stable and the tire can function in this state. However if the cavity 52 is pressurized then $$\frac{T}{R} = PW - 2F_o$$

where P = excess pressure in the cavity
and W = width
and the compressive stress (T negative) is reduced or even converted to a tensile stress (T positive).

Thus support for the breaker is provided by the pressure and the edges are supported to provide the support hoops for the sidewalls.

This example is very efficient in that the pneumatic stiffness at a given pressure may be more than twice that of a more conventional tire, allowing very much larger loads to be carried.

FIG. 15 shows the tubular cavity and hoop as integral with the tire tread region. This is not essential although it minimizes relative movement and friction. It is an advantage in some cases to reinforce at least the edges of the tube with, for example, cords wound at nearly 90° to the circumferential direction. The radial thickness of the tube cavity should be at last equal to the normal working deflection so that the inner, rigid hoop is not normally deflected. The hoop itself is required to be relatively rigid to support the compressive stress created by air pressure (and which must not be supported by the sides of the tube). A steel hoop is adequate but it is an advantage to use a thicker hoop of softer material which will survive the occasional large deflection. The mass of the hoop can be varied over a wide range. It is possible therefore to adjust the frequency of its modes of vibration independently of those of the tire leading to the possibility of creating a harmonic damper for some of the tire vibration frequencies. It will therefore be possible to 'tune' the tire for better comfort.

Figure 16:
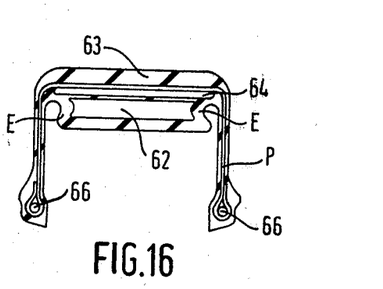
FIG. 16 is a detailed amendment to the structure of FIG. 15.

FIG. 16 shows a similar tire in which the edges E of the flat tube 62 are not reinforced but thickened and of reversed curvature.

These edges constitute 'arches' and can retain the air pressure. The thrust of the arches provides additional support at the edges of the breaker 64 where the casing tension tends to pull inward. It helps therefore to give a "flat" breaker and make the contact pressure distribution more even.

Figure 17:
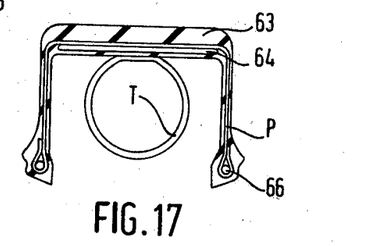
FIG. 17 shows an alternative design to FIG. 15 to stiffen the tread region.

FIG. 17 shows a further embodiment in which the breaker 64 is supported by a tube T which is helically wound with reinforcement cords disposed at a high angle such that inflation causes the main radius to increase without any substantial change in cross-sectional area.

For a 90° reinforcement the equilibrium shape is close to a circle while for lower angles a flattened elliptical shape may be obtained which presses against a greater proportion of the width of the belt inner surface.

Alternatively a number of smaller coils of tube may be used to obtain a more even coverage of the belt inner surface or a longer length arranged in a plurality of coils extending across the width of the tread.

Figures 18, 22:
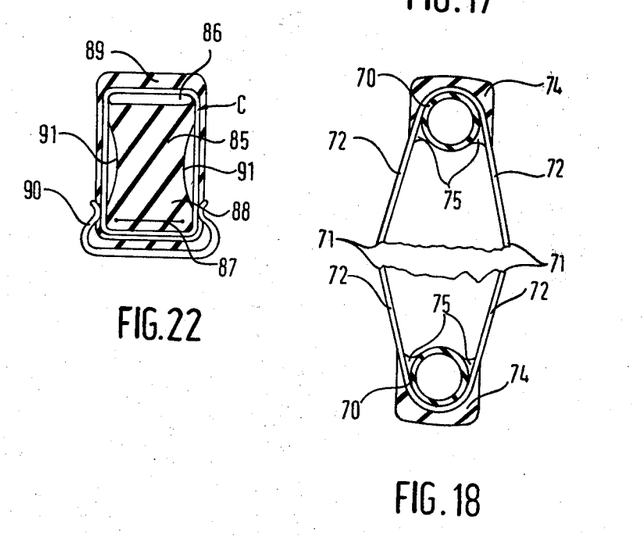
FIG. 18 shows an alternative tire construction according to the present invention.
FIG. 22 shows an alternative form of solid tire according to the present invention.

FIG. 18 shows a variation of the invention which allows the tire to take over part of the function of the wheel, and allows the assembly to survive very large deflections without transmitting excessively large shock loads to the suspension.

A tube 70 is fastened to a ring 71 by cords 72, the ring being rotatable on a suitable axle. The tube 70 may be reinforced as in the preceding example. When inflated it tends to increase in circumference but is restrained by the cords 72 which are therefore placed in tension by the inflation pressure.

Although this example as described contains no breaker it is to be understood that the pressurized tube does provide support for the straight cords of the sidewalls. In effect one hoop supports both walls.

Tires of this type may be pretensioned by axially outward movement of the beads. Such movement may lead to greater lateral stability as well as reducing the breaker tension and improving the comfort.

The cords may be protected by a layer of tread 74 of rubber compound which may or may not be extended as far as the bead regions 71. The cords, if left exposed, need not be traditional tire cord but may, for example, be monofilaments of nylon of any chosen cross-sectional shape or stainless steel wires. Furthermore, the interior of the tire according to this construction is accessible through the spaces between the cords and this can be used to facilitate the fitting of components between the beads to create pretension in the sidewalls.

In order to induce the resistance of this arrangement of this tire to lateral bending moments may be increased for example by elastomeric material fillets 75 which may include reinforcement between the tube 70 and the cord 72 as shown in the Figure or, by the provision of a reinforced breaker region near to the base of the tread either inside or outside the casing.

The above described support hoop stiffening systems are hydraulic and pneumatic but another method is to use precompressed elastic members and some embodiments using such means will now be described.

The arrangement of FIG. 18 uses pneumatic pressure in the tube 70 to press outwardly on the stiffen the tread 76. The assembly could be made to operate without this pressure by thickening the tube walls, using a spring or other reinforcement or filling the tube with a resilient foam.

Figure 19:
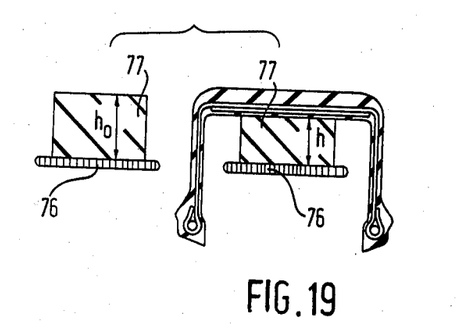
FIG. 19 shows a tire including a precompressed hoop of elastomeric material to stiffen the tread region.

FIG. 19 shows a cross-section of a straight sidewall tire which uses radial precompression of an elastomer by means of a relatively rigid hoop 76 which supports a compressed ring 77 of relatively soft elastomeric material. The elastomeric ring 77 is radially compressed by an amount ($h_o - h$) so that the strain is $$e = \frac{h_o - h}{h_o}$$

and the stress is He, H being the effective Young's Modulus.

If 'W' is the width of the hoop then $T/R = WHe - 2F_o$ (where T = breaker tension and R = breaker radius) it being understood that $2F_o$, the sidewall pretension is greater than zero, either because the breaker has a low circumferential tensile stiffness or because one of the mechanisms above has been used to pretension the sidewall.

The elastomeric ring shown 77 is of the simplest possible form but in practice would be shaped to give special properties. It might for example be made of several narrower ridges running around the tire or across it or even of separate 'spokes' or blocks all of which changes would facilitate cooling of the material. If these ridges or blocks were given the appropriate height to thickness ratio it would be possible to prestress them to a level close to their buckling load so that beyond a certain level their contribution to structural stiffness and heat generation fell to a low level.

Moreover the material need not be solid rubber but could be plastic, foamed plastic, or metal springs.

From the point of view of this invention it is only necessary that a pretension in the sidewalls, $2F_o$, be partly balanced by a precompression, WHe, in the material resting on the hoop.

Figures 20, 21A, 21B:
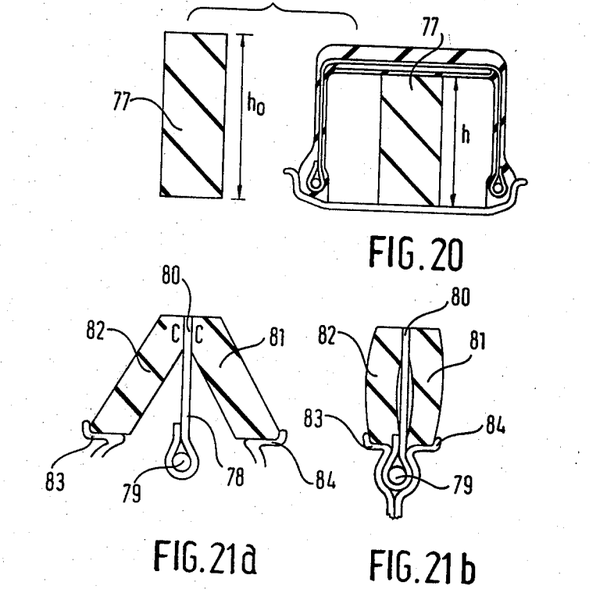
FIG. 20 shows a simplified form of the embodiment of FIG. 19.
FIGS. 21a and 21b show in the simplest form a solid tire according to the present invention which utilizes a single wall.

FIG. 20 shows a very similar arrangement to FIG. 19 except that the ring of elastomer is now supported on the rim rather than on a separate rigid hoop. This is simpler but the increased depth of the elastomer support hoop does imply that prestressing by bead movement will require greater movements to achieve the same prestrain level.

As before this is only the simplest possible cofiguration. To emphasise this two other arrangements are shown in FIGS. 21a and 21b.

FIG. 21a shows the upper half of a cross-section through a single wall 78 reinforced by radially-extending cords and anchored at its inner edge to a bead 79. The outer edge is bonded at 80 to two part cones of elastomer 81, 82. On closing the rim flanges 83,84 together the configuration shown in FIG. 21b results. In this state there is a radially outward tension $F_o$ in the wall 78 which is supported at its outer edge by the comressive stress resulting from shortening of the side of the rubber cones.

The magnitude of this tension can affect the Load/Deflection curve independently of the structural stiffness given an improved tire.

A protective layer of tread compound not shown is added covering the exposed radially outermost edge of the wall.

FIG. 22 shows half of the cross-section through an approximately rectangular hoop of elastomeric material 88 which is curved in contact with a breaker 86 and contains a cavity 87. After cure it is wrapped with a continuous helix C of rubberized tire cord fabric or equivalent material, and then protected by a layer 89 of tread (or wear resistant) compound. After mounting on a rim 90 the continuous annular cavity 87 is inflated using a solidyfying liquid. This expands the inner part of the 'tire' to fill the rim cavity and in so doing tightens the cords tending to pull the breaker inwards and compressing the material 85 outwards against it. Since there is a radial component of tension '$2F_o$' which falls when the tire is deflected this tire also shows the appropriate type of Load/Deflection equation $L=(A+Ct)d$, where L=load supported
A=effective stiffness of structure
C=constant
t=pretension in sidewall
d=deflection of tire The sides of the hoop of elastomer 88 are shown cut away at the sides 91 to emphasise that the cords are free to go slack when the tire is deflected. Without the cutaway there is a risk that bulging of the rubber under deflection will tend to increase the tension '$2F_o$' or at least minimize its reduction. The efficiency of these tires relies on obtaining the maximum possible reduction in the pretension when the tire is deflected and thus cutouts are preferred.

For all of the types described a large sidewall pretension tends to pull the breaker inwards at one or two points across the width while the supports mechanism presses outwards over the whole width. These forces tend to bend the breaker cross-section.

Since the breaker is a hoop this bending implies extensions and compressions in the circumferential direction, additional to the strains caused by bending into and out of the contact patch.

It is an advantage to minimize transverse bending by designing for increased transverse rigidity.

It is possible to consider novel arrangements as well as conventional materials.

For example a solid hoop of nylon moulded to a wavy shape would have a very high transverse ridigity. So too would crimped sheet steel or a hoop assembled from alternate sectors of rigid and soft material.

Having now described my invention what I claim is:
1. A tire and wheel assembly comprising a wheel rim including two circumferentially-extending bead seats and a tire comprising two circumferentially-extending bead regions each retained upon a respective bead seat by a continuous bead ring which is substantially incapable of circumferential expansion or compression, a circumferentially-extending tread which is capable of resisting circumferential expansion but capable of local radial deflection, and two load-carrying sidewalls each having a radially-innermost edge and a radially-outermost edge, the radially-outermost edge being attached to a respective edge of the tread and the radially-innermost edge being attached to a respective bead region, each sidewall including tension-resisting reinforcements extending between said edges and being capable of being placed in tension, and pretensioning means, including means to relatively move the rim bead seats and therefore the tire bead regions for placing said tension-resisting reinforcements in tension after the tire has been built and before the tire is loaded.

2. A tire and wheel assembly comprising a wheel rim including two circumferentially-extending bead seats and a tire comprising two circumferentially-extending bead regions each retained upon a respective bead seat by a continuous bead ring which is substantially incapable of circumferential expansion or compression, a circumferentially-extending tread which is capable of resisting circumferential expasion but capable of local radial deflection, and two load-carrying sidewalls each having a radially-innermost edge and a radially-outermost edge, the radially-outermost edge being attached to a respective edge of the tread and the radially-innermost edge being attached to a respective bead region, each sidewall including tension-resisting reinforcements extending between said edges and being capable of being placed in tension, and pretensioning means comprising a cavity radially inwards of the tread and having a height less than the tire sectional height and a fluid under pressure retained in said cavity.

3. A tire and wheel assembly comprising a wheel rim including two circumferentially-extending bead seats and a tire comprising two circumferentially-extending bead regions each retained upon a respective bead seat by a continuous bead ring which is substantially incapable of circumferential expansion or compression, a circumferentially-extending tread which is capable of resisting circumferential expansion but capable of local radial deflection, and two load-carrying sidewalls each having a radially-innermost edge and a radially-outermost edge, the radially-outermost edge being attached to a respective edge of the tread and the radially-innermost edge being attached to a respective bead region, each sidewall including tension-resisting reinforcements extending between said edges and being capable of being placed in tension, and pretensioning means comprising a solid or semi-solid material in compression radially inwards of the tread, said material being supported on a rigid loop radially outwards of the wheel rim.

4. A tire and wheel assembly comprising a wheel rim including a pair of circumferentially-extending bead seats and a tire comprising a pair of axially spaced apart circumferentially-extending bead regins retained upon each bead seat by a continuous bead ring on each bead which is substantially incapable of circumferential expansion or compression, a circumferentially-extending tread which is capable of resisting circumferential expansion but capable of local radial deflection, and two sidewalls each comprising a load-carrying wall having a radially-innermost edge and a radially-outermost edge, the radially-outermost edge being attached to the tread and the radially-innermost edge being attached to the bead region, the wall including tension-resisting reinforcements extending between said edges and being capable of being placed in tension, said tire further comprising a breaker radially beneath said tread, a tubular cavity radially beneath said breaker and extending circumferentially around the tire, said cavity having a with substantially equal to the width of the breaker and a radial height substantially less than the tire sectional height, and a substantially rigid hoop located in the radially inner surface wall of the tubular cavity and having an axial dimension similar to the axial width of said cavity, the cavity being pressurized with fluid so as to apply a radially outwards force to the breaker and thereby pretension the sidewalls.

5. A tire and wheel assembly comprising a wheel rim including a pair of circumferentially-extending bead seats and a tire comprising a pair of axially spaced apart circumferentially-extending bead regions retained upon each bead seat by a continuous bead ring on each bead which is substantially incapable of circumferential expansion or compression; a circumferentially-extending tread region which is capable of resisting circumferential expansion but capable of local radial deflection, said tread region comprising an outer layer of tread rubber compound, a breaker reinforcement having a substantial degree of transverse rigidity having an axial width substantially equal to and being located radially beneath said tread compound, a relatively rigid hoop extending around the tire beneath and spaced-apart from the breaker and, between the said breaker and rigid hoop a series of precompressed blocks of resilient material so as to connect the breaker and thus the tread and its edges to said rigid hoop; two sidewalls each comprising a load-carrying wall having a radially-innermost edge and a radially-outermost edge, the radially-outermost edge being attached to the tread and the radially-outermost edge being attached to the bead region, the wall including tension-resisting reinforcements extending between said edges and being capable of being placed in tension.

6. A tire and wheel assembly comprising a wheel rim including a circumferentially-extending bead seat and a tire comprising a circumferentially-extending bead region retained upon the bead seat by a continuous bead ring which is substantially incapable of circumferential expansion or compression, a circumferentially-extending tread which is capable of resisting circumferential expansion but capable of local radial deflection, and a load-carrying wall having a radially-innermost edge and a radially-outermost edge, the radially-outermost edge being attached to the tread and the radially-innermost edge being attached to the bead region, the wall including tension-resisting reinforcements extending between said edges and being capable of being placed in tension, and pretensioning means for placing said tension-resisting reinforcements in tension after the tire has been built and before the tire is loaded, said pretensioning means comprising preshrunk cords in the tire wall.

7. A tire and wheel assembly comprising a wheel rim including a circumferentially-extending bead seat and a tire comprising a circumferentially-extending bead region retained upon the bead seat by a continuous bead ring which is substantially incapable of circumferential expansion or compression, a circumferentially-extending tread which is capable of resisting circumferential expansion but capable of local radial deflection, and a load-carrying wall having a radially-innermost edge and a radially-outermost edge, the radially-outermost edge being attached to the tread and the radially-innermost edge being attached to the bead region, the wall including tension-resisting reinforcements extending between said edges and being capable of being placed in tension, and pretensioning means for placing said tension-resisting reinforcements in tension after the tire has been built and before the tire is loaded, said pretensioning means comprising means for crimping the wall immediately radially outwardly of the bead region.

8. A tire and wheel assembly according to claim 54 in which the tire is pneumatic and the pretensioning means is capable of placing the tension-resisting reinforcements in tension before the tire and rim is inflated.

9. A tire and wheel assembly according to claim 6 wherein the wall is straight or includes a substantial portion of its length which is straight, when an axial cross-section of the tyre is considered.

10. A tire and wheel assembly according to claim 6 wherein the tread is reinforced by a breaker.

11. A tire and wheel assembly according to claim 6 wherein the wall has a low resistance to compression forces in a radial direction.

12. A tire and wheel assembly according to claim 6 wherein the preshrunk cords extend radially of the assembly.

13. A tire and wheel assembly according to claim 6 wherein the preshrunk cords extend at an angle to the radial direction.

14. A tire and wheel assembly according to claim 6 wherein the wheel rim comprises a pair of axially-spaced apart bead seats and the tire comprises a pair of load-carrying tire walls axially spaced apart to provide tire sidewalls, each sidewall being attached at its innermost edge to a bead region retained upon a respective bead seat and at its outermost edge to a respective edge of the tread.

15. A tire and wheel assembly according to claim 49 wherein the pretensioning means comprises means provided in the wheel rim to axially displace the bead regions thereby tending to lengthen a wall.

16. A tire and wheel assembly according to claim 15 comprising a packing piece inserted between a bead region and a rim flange associated with the bead seat on the rim.

17. A tire and wheel assembly according to 15 wherein the wheel rim is divided into two parts each having one of said bead seats, the wall reinforcements being pretensioned when the two parts are axially displaced towards one another and secured together.

18. A tire and wheel assembly according to claim 17 wherein one of said parts is capable of sliding within the other to define an enclosed space therebetween which is capable of being pressurized to cause axial displacement thus causing pretension of the wall reinforcements.

19. A tire and wheel assembly according to claim 18 wherein the space is sealed by at least one elastomeric ring and pressurized by gas, liquid or solidifying liquid.

20. A tire and wheel assembly according to claim 18 wherein the wheel rim comprises a wall.

21. A tire and wheel assembly according to claim 20 wherein the wheel rim comprises a well cover.

22. A tire and wheel assembly according to claim 17 wherein one of said parts is capable of sliding within the other and having sandwiched therebetween an elastomeric sleeve.

23. A tire and wheel assembly according to claim 17 wherein one of said parts is provided with a plurality of spacing plates spaced apart around the rim circumference but rotatable about a radial axis with respect to the rim to be moved into a position to retain the other of said parts in said axially displaced position.

24. A tire and wheel assembly according to claim 17 wherein one of said parts is provided with a plurality of spring leaves each having a hole each of which is engageable by one of a plurality of projections provided on the other part to retain the parts in said axially displaced position.

25. A tire and wheel assembly according to claim 15 wherein the rim comprises a cylinder and two bead seats each axially displaceable, and being connected by a plurality of circumferentially spaced apart straps, and a tube positioned between the cylinder and said straps capable of being pressurized to cause the seats and bead regions thereon to be axially displaced towards one another, thereby creating pretension in the tire walls.

26. A tire and wheel assembly according to claim 49 wherein said pretensioning means comprises an axially expandable separator ring located in the cavity formed between tire and rim, which ring on axial expansion presses against the interior surface of each tire wall thereby tending to lengthen said walls and create pretension therein.

27. A tire and wheel assembly according to claim 26 wherein said separator ring comprises two cylinders, one inside the other, and two hoops each located side-by-side between said cylinders to define an annular space therebetween which is capable of pressurization thereby causing the two hoops to move axially and press against the tire wall.

28. A tire and wheel assembly according to claim 49 wherein the pretensioning means comprises means to displace the bead region circumferentially thereby lengthening the walls to create pretension.

29. A tire and wheel assembly according to claim 28 wherein the wheel bead seats and the tire bead regions are formed with a plurality of axially-extending ridges, of irregular saw-tooth cross section capable of acting as a ratchet to retain the tire bead regions in a circumferentially displaced position.

30. A tire and wheel assembly according to claim 29 wherein the ridges on the bead seats and bead regions do not mate exactly and are formed in the opposite sense to one another, whereby on rotation of the assembly in use the bead regions move relative to the bead seats to tend to increase circumferential displacement.

31. A tire and wheel assembly according to claim 2 wherein the cavity is supported by a rigid hoop.

32. A tire and wheel assembly according to claim 3 wherein the tread is reinforced by a breaker which receives the radially outwardly directed force.

33. A tire and wheel assembly according to claim 4 wherein only the cavity is pressurised.

34. A tire and wheel assembly according to claim 4 wherein the edges of the cavity are formed with a reverse curvature which tend to straighten when the cavity is pressurised.

35. A tire and wheel assembly according to claim 4 wherein the cavity is defined by a circular cross-section tube helically wound with reinforcement.

36. A tire and wheel assembly according to claim 4 wherein the cavity is defined by a tube of length greater than the tread circumference, the tube being helically coiled beneath and across the width of the tread.

37. A tire and wheel assembly according to claim 5 wherein the blocks are arranged in a continuous ring.

38. A tire and wheel assembly according to claim 5 wherein the wheel rim itself comprises the rigid hoop.

39. A tire comprising a pair of axially spaced-apart bead regions, two sidewalls and a tread, a breaker radially beneath said tread, a tubular cavity radially beneath said breaker and extending circumferentially around the tire, having a width substantially equal to the width of the breaker and a radial height substantially less than the tire sectional height, and a substantially rigid hoop located in the radially inner surface wall of the tubular cavity and having an axial dimension similar to the axial width of said cavity wherein the cavity is pressurized with fluid so as to apply a radially outwards force to the breaker and thereby pretension the sidewalls.

40. A tire according to claim 39 wherein only the cavity is pressurized.

41. A tire according to claim 39 wherein the edges of the cavity are formed with a reverse curvature which tend to straighten when the cavity is pressurized.

42. A tire according to claim 39 wherein the cavity is defined by a circular cross-section tube helically wound with reinforcement.

43. A tire according to claim 39 wherein the cavity is defined by a tube of length greater than the tread circumference, the tube being helically coiled beneath and across the width of the tread.

44. A tire comprising a pair of axially spaced-apart bead regions, two sidewalls and a tread region comprising an outer layer of tread rubber compound, a breaker reinforcement having a substantial degree of transverse rigidity having an axial width substantially equal to and being located radially beneath said tread compound, a relatively rigid hoop extending around the tire beneath and spaced-apart from the breaker and, between the said breaker and rigid hoop a series of precompressed blocks of resilient material so as to connect the breaker and thus the tread and its edges to said rigid hoop.

45. A tire according to claim 44 wherein the blocks are arranged in a continuous ring.

46. A tire according to claim 45 wherein the tyre sidewalls include pre-shrunk cords to provide pretension.

47. A tire and wheel assembly according to claims 1, 2, 3, 4, 5 or 6 in which the tire is pneumatic and the pretensioning means is capable of placing the tension-resisting reinforcements in tension before the tire and rim is inflated.

48. A tire and wheel assembly according to claims 1, 2, 3, 4, 5 or 6, wherein the wall is straight or includes a substantial portion of its length which is straight, when an axial cross-section of the tire is considered.

49. A tire and wheel assembly according to claims 1, 2, 3, 4, 5 or 6, wherein the tread is reinforced by a breaker.

50. A tire and wheel assembly according to claims 1, 2, 3, 4, 5 or 6, wherein the wall has a low resistance to compression forces in a radial direction.

51. A tire and wheel assembly according to claims 1, 2, 3, 4, 5 or 6, wherein the tension-resisting reinforcements comprise cords or wires extending radially of the assembly.

52. A tire and wheel assembly according to claims 1, 2, 3, 4, 5 or 6, wherein the tension-resisting reinforcements comprise cords or wires extending at an angle to the radial direction.

* * * * *